United States Patent [19]

Suzuki

[11] 3,944,879
[45] Mar. 16, 1976

[54] PIN CUSHION DISTORTION CORRECTION CIRCUIT

[75] Inventor: Masao Suzuki, Tokyo, Japan

[73] Assignee: Sony Corporation, Tokyo, Japan

[22] Filed: May 16, 1974

[21] Appl. No.: 470,654

[30] Foreign Application Priority Data

May 19, 1973 Japan.......................... 48-59022[U]

[52] U.S. Cl................................... 315/370; 315/400
[51] Int. Cl.².......................................... H01J 29/56
[58] Field of Search..................... 315/370, 371, 400

[56] References Cited
UNITED STATES PATENTS

| | | |
|---|---|---|
| 3,571,653 | 3/1971 | Hansen ................................ 315/370 |
| 3,700,958 | 10/1972 | Haferl ................................ 315/371 |
| 3,846,673 | 11/1974 | Hirota et al.......................... 315/400 |

*Primary Examiner*—Richard A. Farley
*Assistant Examiner*—G. E. Montone
*Attorney, Agent, or Firm*—Lewis H. Eslinger; Alvin Sinderbrand

[57] ABSTRACT

A pin cushion distortion correction circuit is disclosed in which a parallel circuit of a resistor and a diode is inserted into the base circuit of a driving transistor of a saturable reactor for the correction of left and right pin cushion distortions to increase a correction current corresponding to the central portion of a video screen.

9 Claims, 8 Drawing Figures

PIN CUSHION DISTORTION CORRECTION CIRCUIT

BACKGROUND OF THE INVENTION

1. Field of the Invention

The present invention relates generally to a pin cushion distortion correction circuit for a television receiver, and more particularly is directed to a pin cushion distortion correction circuit for a television receiver for preventing the formation of a distortion from being produced at the center portion of a video screen.

2. Description of the Prior Art

There has been proposed in the art a pin cushion distortion correction circuit for a television receiver, as shown in FIG. 1. In the prior art shown in FIG. 1, an input terminal 1, which is supplied with a horizontal driving signal, is connected to the gate electrode of a gate-controlled switch GCS 2, which forms a horizontal output circuit. The cathode electrode of the gate-controlled switch GCS 2 is grounded, and the anode electrode thereof is connected through a horizontal output transformer 3 to a voltage terminal 4, which is supplied with a positive DC voltage. The anode is also and grounded through a parallel circuit consisting of a damper diode 5 and a tuning capacitor 6. The anode electrode of the gate-controlled switch GCS 2 is further grounded through a series connection of a horizontal deflection coil 7, a secondary winding 8b of a saturable reactor 8 for the correction of left and right pin cushion distortions, and a capacitor 9 for S-letter correction. A vertical output signal input terminal 10 is connected to one end of a series connection of a vertical deflection coil 11 and a capacitor 12 the other end of which is grounded. At the connection point between the vertical deflection coil 11 and the capacitor 12, there is obtained a parabolic wave signal in synchronism with the vertical synchronizing signal. This connection point is connected through a series connection of a capacitor 13 and a resistor 14 to the base electrode of an NPN-type transistor 15. The base electrode of the transistor 15 is grounded through a resistor 16 and also connected through a resistor 16a to the voltage terminal 4 which is supplied with a positive DC voltage to be supplied with a predetermined bias voltage. The emitter electrode of the transistor 15 is grounded through a resistor 17 and its collector electrode is connected through a primary winding 8a of the saturable reactor 8 to the voltage terminal 4.

The inductance-current characteristic of the saturable reactor 8 used in the prior art pin cushion distortion correction circuit of FIG. 1 is shown by a curve $a$ in FIG. 2 in which the abscissa represents the current $I_V$ and the ordinate the inductance $L_H$, respectively. From FIG. 2, it will be apparent that as the current $I_V$ increases, the slope of curve $a$ gradually flattens. The voltage V applied to the base electrode of the transistor 15 is shown in FIG. 4A in which the abscissa represents the time T and the ordinate the voltage V, respectively. Accordingly, the parabolic current applied to the primary winding 8a of the saturable reactor 8 becomes as shown in FIG. 2 by a curve $b$. Thus, it often occurs that the correction for the left and right pin cushion distortions by the parabolic current can not be achieved sufficiently and correctly at the center of the video screen.

SUMMARY OF THE INVENTION

According to the present invention, a pin cushion distortion correction circuit is provided in which a parallel circuit consisting of a resistor and a diode is inserted into the base circuit of a driving transistor of a saturable reactor for the correction of pin cushion distortions on the left and right sides of the raster by increasing the correction current corresponding to the central portion of a video screen.

Accordingly, it is an object of the present invention to provide a pin cushion distortion correction circuit free from the deflects encountered in the prior art.

It is another object of the invention to provide a pin cushion distortion correction circuit with which left and right pin cushion distortions at the center of a video screen can be corrected positively.

The additional and other objects, features and advantages of the invention will become apparent from the following description taken in conjunction with the accompanying drawings.

BRIEF DESCRIPTION OF THE DRAWING

Throughout the drawing, like reference numerals represent like elements and hence no description will be repeated on the like elements.

DESCRIPTION OF THE PREFERRED EMBODIMENTS

An embodiment of the pin cushion distortion correction circuit according to the present invention will be described hereinbelow with reference to FIG. 3.

Figure 1:
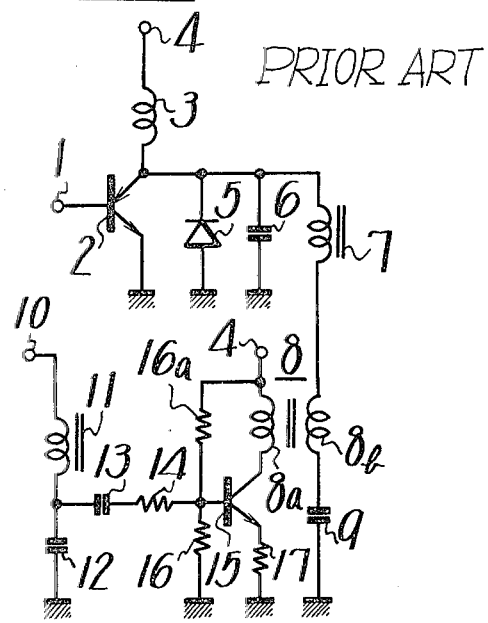
FIG. 1 is a circuit diagram showing the prior art pin cushion distortion correction circuit.
Figure 3:
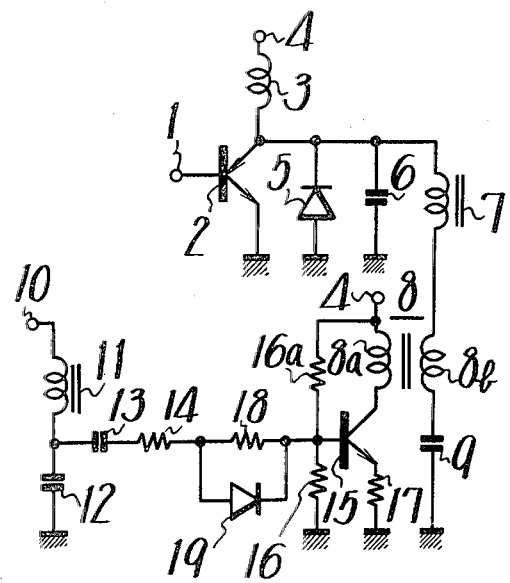
FIG. 3 is a circuit diagram showing an embodiment of the pin cushion distortion correction circuit according to the invention.

In the embodiment of the invention shown in FIG. 3, the connection point between the vertical deflection coil 11 and the capacitor 12 is connected to the base electrode of the transistor 15 through a series connection of the capacitor 13, the resistor 14 and a parallel circuit of a resistor 18 with a predetermined resistance value and a diode 19. The base electrode of the transistor 15 is grounded through the resistor 16. The remainder of the circuit is substantially same as that of the prior art shown in FIG. 1.

With the present invention constructed as above, the voltage for the correction of left and right pin cushion distortions, which is obtained at the connection point between the vertical deflection coil 11 and the capacitor 12, is applied to the base electrode of the transistor 15 through the capacitor 13 and the resistors 14 and 18 when the voltage drop across the resistor 18 is lower than the conduction voltage $V_D$ of the diode 18. That is, the voltage $E_0$ which is applied to the base electrode of the transistor 15 is expressed as follows if it is assumed that the input voltage is taken as $E_{in}$, the resistance values of the resistors 14 and 18 are taken as $R_1$ and $R_2$, respectively, and the resistance value determined by the resistors 16, 17 and so on is taken as $R_L$.

$$E_o = E_{in} \frac{R_L}{R_1 + R_2 + R_L}$$

When the voltage drop across the resistor 18 exceeds the conduction voltage $V_D$ of the diode 19, the voltage obtained at the connection point between the vertical deflection coil 11 and the capacitor 12 is applied to the base electrode of the transistor 15 through the capacitor 13, the resistor 14 and the diode 19 with less attenuation. That is, the voltage $E_1$ which is applied to the base electrode of the transistor 15 is expressed as follows because the impedance of the diode 19 is substantially zero at this time.

$$E_1 = E_{in} \frac{R_L}{R_1 + R_L}$$

Figure 2:
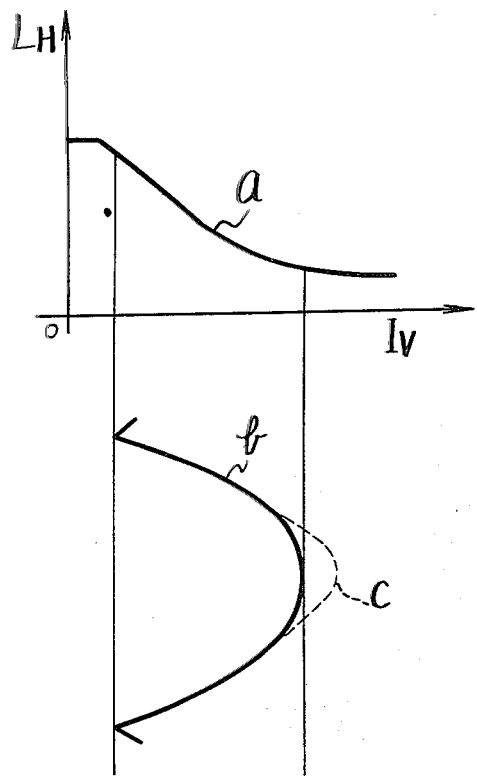
FIGS. 2, 4A, 4B, and 4C are wave form diagrams used for explaining the prior art and the present invention.
Figure 4A:
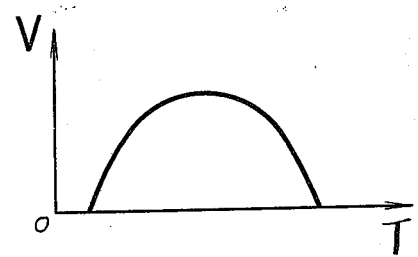
Figure 4B:
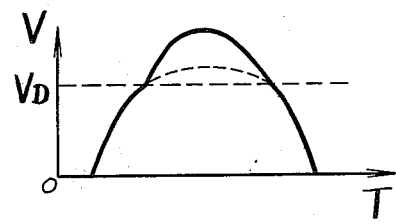

Accordingly, when the voltage drop across the resistor 18 exceeds the conduction voltage $V_D$ of the diode 19, the impedance value between the connection point of the vertical deflection coil 11 and the capacitor and the base electrode of the transistor 15 is decreased by the resistance value of the resistor 18. Thus, the voltage applied to the base electrode of the transistor 15 is increased due to the decreased value of the impedance as shown in FIG. 4B. As a result of this, the current flowing through the saturable reactor 8 for the correction of the pin cushion distortion of the left and right parts of the raster becomes as shown by a dotted line curve C in FIG. 2. From this curve C, it will be apparent that the current for the correction of pin cushion distortion increases when the electron beam is scanning the vertically central part.

Accordingly, it will be understood that the present invention improves correction for the pin cushion distortions on the left and right of a raster can be sufficiently achieved at the vertically central part of the video screen.

Figure 5:
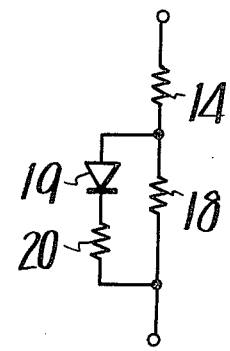
FIGS. 5 and 6 are circuit diagrams showing the main parts of other embodiments of the invention, respectively.

FIG. 5 shows the main part of another embodiment of the invention. In the embodiment of FIG. 5, a resistor 20 with a predetermined resistance value is connected in series to the diode 19 to adjust the correction current corresponding to the center of the video screen in magnitude. This second embodiment may be connected in place of the resistors 14 and 18 and the diode 19 in a circuit that is substantially same as that of FIG. 3.

Figure 6:
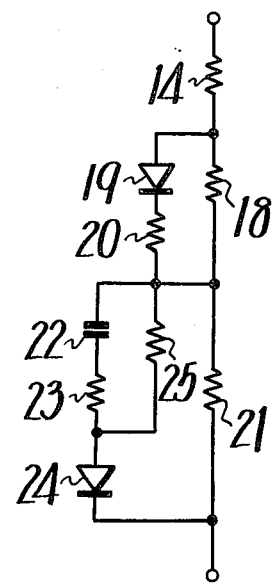

FIG. 6 shows the main part of a further embodiment of the invention. In the embodiment of FIG. 6, a resistor 21 is inserted between the base electrode of the transistor 15 (not shown in FIG. 6) and the connection point of the resistor 18 and the resistor 20 used in the embodiment of FIG. 5, a series connection of a capacitor 22, a resistor 23 and a diode 24 is connected in parallel to the resistor 21, and the connection point between the resistors 18 and 20 is connected through a resistor 25 to the connection point between the resistor 23 and the diode 24. Though not shown, the remainder of the circuit construction is substantially the same as that of FIG. 3.

Figure 4C:
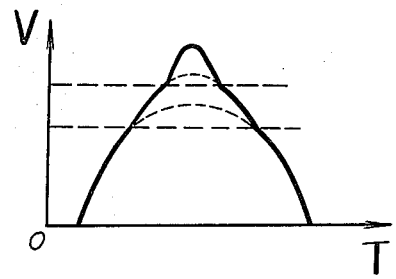

In the embodiment of FIG. 6, the capacitor 22 is charged through the diode 24, the voltage to which the capacitor 22 is charged is added to the voltage applied to the base electrode of the transistor 15 (refer to FIG. 3), the waveform of which is shown in FIG. 4B, and hence a voltage, which has a two-step convex portion as shown in FIG. 4C, is applied to the base electrode of the transistor 15. Thus, the resulting correction current for pin cushion distortion which corresponds to the above voltage waveform can be obtained.

In the embodiment of FIG. 6, the resistor 25 serves as the resistor for discharging of the capacitor 22. The resistor 23 acts to adjust the peak voltage value, and hence, may be omitted.

It may be apparent that many modifications and variations could be effected by those skilled in the art without departing from the spirits and scope of the novel concept of the present invention.

I claim as my invention:

1. A correction circuit for correction of pin cushion distortion of the sides of a television raster, said circuit comprising:
    A. a horizontal deflection circuit;
    B. a source of signal synchronous with the vertical deflection frequency of said raster, said signal having a generally parabolic waveform;
    C. a saturable reactor connected to said deflection circuit to modify the horizontal deflection current to correct said pin cushion distortion; and
    D. a coupling circuit comprising:
        1. an impedance connected between said signal source and said reactor to control the amplitude of said signal applied to control said reactor, and
        2. unidirectionally conductive means connected to said impedance to control the effective value thereof during peak values of said signal to modify the waveform of said signal in order to correct for non-linear response of said reactor.

2. The correction circuit of claim 1 in which said impedance is a resistor.

3. The correction circuit of claim 2 in which said unidirectionally conductive device is a diode.

4. The correction circuit of claim 3 in which said coupling circuit comprises a transistor comprising:
    A. an output circuit connected to said reactor to control current flow therethrough; and
    B. an input circuit connected to said resistor and said diode, said diode being polarized to be conductive when said parabolic signal is in excess of a predetermined amount said diode reducing the effective resistance of said resistor during such periods of conductivity to increase the amplitude of said parabolic signal applied to said input circuit.

5. The correction circuit of claim 4 in which said resistor and said diode are connected in parallel.

6. The correction circuit of claim 5 in which said coupling circuit comprises a second resistor connected in series with said diode to form a series circuit connected in parallel with said first-named resistor.

7. The correction circuit of claim 6 comprising, in addition, a second parallel circuit comprising:
    A. a third resistor; and
    B. a second series circuit comprising a capacitor connected in series with a second diode, said second series circuit being connected in parallel with said third resistor, and said second parallel circuit being connected in series with said first-named parallel circuit.

8. The correction circuit of claim 7 comprising a charge-limiting resistor connected in series with said capacitor.

9. The correction circuit of claim 8 comprising a discharge resistor connected in parallel with said capacitor and in series with said second diode.

* * * * *